United States Patent [19]
Kuretake et al.

[11] Patent Number: 5,547,218
[45] Date of Patent: Aug. 20, 1996

[54] AIR BAG AND AIR BAG DEVICE

[75] Inventors: Masato Kuretake; Takayasu Zushi; Motonobu Kitagawa; Kazuhiko Yamakawa; Yoshimi Okamoto; Sawayo Uda, all of Shiga, Japan

[73] Assignee: Takata Corporation, Tokyo, Japan

[21] Appl. No.: 155,172

[22] Filed: Nov. 22, 1993

[30] Foreign Application Priority Data

Dec. 1, 1992 [JP] Japan .................................. 4-321695

[51] Int. Cl.$^6$ .................................. B60R 21/20
[52] U.S. Cl. .................................. 280/743.1; 280/743.2
[58] Field of Search .................... 280/743 R, 743 A, 280/740, 728 R, 731, 739

[56] References Cited

U.S. PATENT DOCUMENTS 5,100,168  3/1992  Horiuchi et al. ................. 280/743 R
5,225,435  1/1994  Fischer .......................... 280/743 R
5,280,954  1/1994  Henseler et al. .................. 280/743 R
5,362,101  11/1994  Sugiura et al. ................... 280/743 A
5,378,019  1/1995  Smith et al. ..................... 280/743 R
5,395,134  3/1995  Gunn et al. ..................... 280/743 A X

FOREIGN PATENT DOCUMENTS 0167048  7/1991  Japan ............................. 280/743 R
5213139  8/1993  Japan ............................. 280/743 R Primary Examiner—Christopher P. Ellis
Attorney, Agent, or Firm—Kanesaka & Takeuchi

[57] ABSTRACT

An air bag consists of a front panel and rear panel. An inflater mounting opening is provided at the central portion of the rear panel. The rear panel and the front panel are connected to each other at a vicinity of the center thereof by threads. The threads allow the air bag to extend sideward at first, and then the threads are chopped so as to allow the air bag to extend forward.

8 Claims, 6 Drawing Sheets 5,547,218

AIR BAG AND AIR BAG DEVICE

BACKGROUND OF THE INVENTION

1. Field of the Invention

The present invention relates to an air bag and an air bag device for extending an air bag at the time of a collision of a vehicle to protect an occupant and particularly, to an air bag and an air bag device to be mounted in a steering unit and suited as an air bag device for a driver. More particularly, the present invention relates to an air bag device which is improved to have the air bag quickly extended vertically and horizontally.

2. Description of the Related Art

The air bag device to be mounted in a stationary portion in front of a seat of a vehicle is intended to protect an occupant in an emergency such as a collision, by inflating (or extending) the air bag with pressure of gas injected from a gas generator called an "inflater".

FIG. 10 shows an example of an air bag device for a driver of the prior art. An inflater 14 has a leading end fitted in a central opening (or inflater mounting hole) 12 which is formed in a main plate 10a of a retainer 10.

An air bag 16 is formed with a receiving hole 18 for receiving a leading end of the inflater 14. The receiving hole 18 is arranged around a peripheral edge of the mounting hole 12. The receiving hole 18 of the air bag has a peripheral edge held on the peripheral edge of the mounting hole 12 by a holding ring (or patch) 20.

The air bag 16 and the inflater 14 are fixed on the retainer 10 by fixing stud bolts 38 on the holding ring 20, by threading the stud bolts 38 into bolt holes of the air bag 16, bolt holes of the retainer 10 and bolt holes formed in a flange of the inflater 14, and by fastening nuts 40.

The air bag 16 is folded in an extensible state and covered with a module cover 22. The module cover 22 is torn by pressure of inflation of the air bag 16 when the air bag 16 is extended by gas injected from the inflater 14.

The driver's air bag device is desirable to protect the driver by extending the air bag 16 quickly at first in the vertical and horizontal directions in front of the driver when the inflater 14 is activated.

OBJECT AND SUMMARY OF THE INVENTION

An object of the present invention is to provide an air bag and an air bag device which has an air bag quickly extended vertically and horizontally in front of a driver when an inflater is activated.

According to an air bag of a first aspect, the air bag has an opening for an inflater in a central portion of a rear panel thereof. A central portion of a rear panel of the air bag is connected to a front panel of the air bag by means of a connecting mechanism. The mechanism allows the air bag to extend forward after at least a part thereof extends sideward completely.

According to an air bag of a second aspect, the connecting mechanism of the first aspect consists of adhesion by adhesive.

An air bag device of the present invention has a retainer having a main plate, an inflater mounting opening formed in a central portion of the main plate, an inflater having a leading edge mounted in the opening of the retainer and having a plurality of gas injection ports in its side periphery, an air bag mounted on the retainer and being folded in an expandable shape by an injection of gas from the inflater, a module cover covering the air bag capable of being torn when the air bag expands. The air bag is folded in a first direction which extends along the main plate of the retainer, then folded in a second direction which crosses perpendicularly the first direction. The rear panel and the front panel of the air bag are sewn together by a thread. Stitches of the thread extends straight along a folding line made by a first folding in the first direction. The thread of the stitches is chopped after the air bag is extended in the second direction. As a result, the air bag extends sideward in the second direction at first, and then the air bag extends sideward in the first direction and also forward.

Connecting strength between the rear panel and the front panel can be set as desired by predetermining the tensile strength of the thread and also by selecting the number of the stitches for the seam.

According to the air bag of the present invention, since the central portion of the rear panel and the front panel are connected, the gas injected from the inflater extends the air bag sidewardly in a radial direction. When the air bag makes a sideward extention of at least a part thereof, injected gas pressure tends to apply mainly to the direction which makes the front panel and the rear panel separate. Thereby, the air bag extends forward.

According to the second aspect, the adhesion by adhesive causes the front panel and the rear panel of the air bag to be easily connected.

DESCRIPTION OF THE PREFERRED EMBODIMENTS

An embodiment of the present invention will be described in the following with reference to the accompanying drawings.

Figure 9:
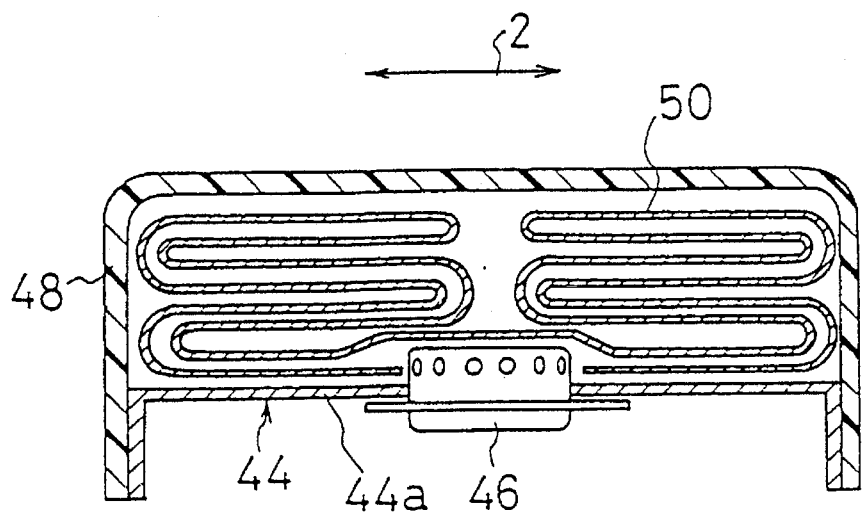
FIG. 9 is a longitudinal sectional view of an air bag device according to an embodiment.
Figure 10:
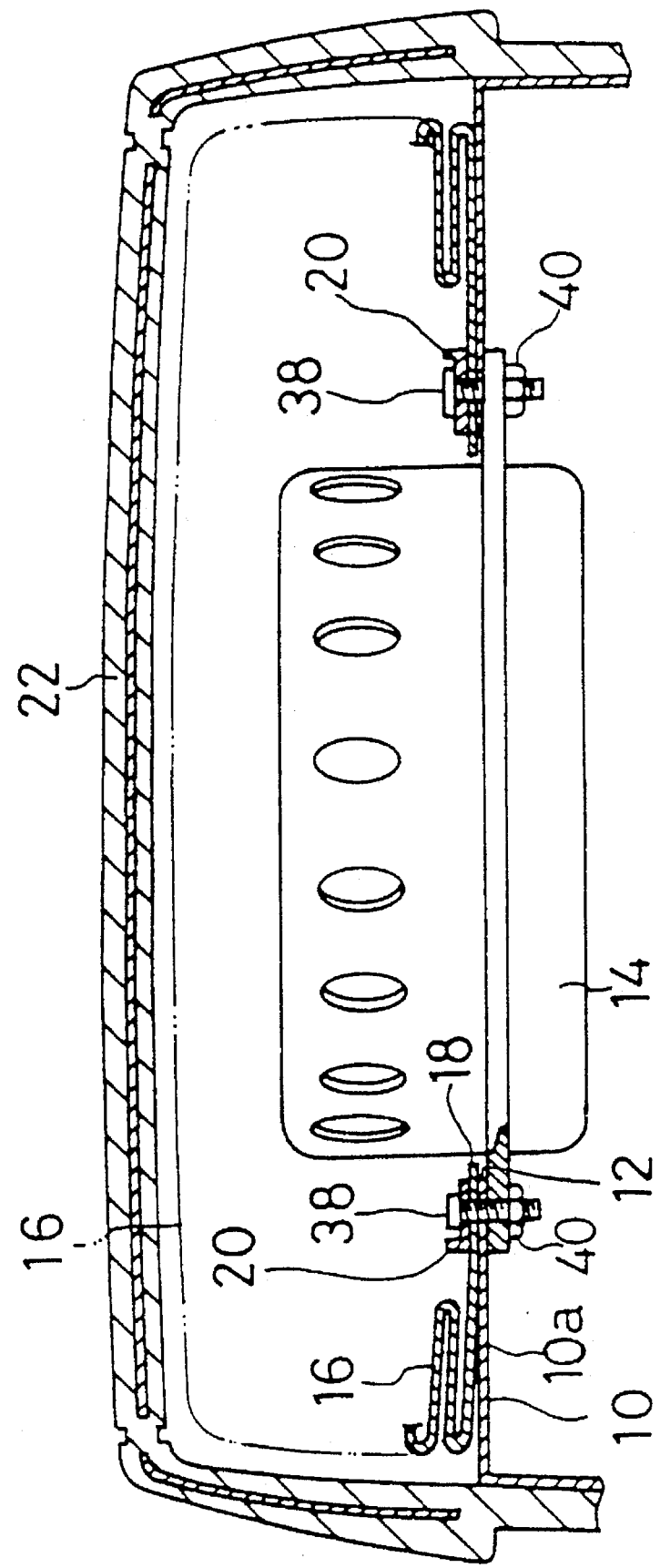
FIG. 10 is a longitudinal sectional view showing the air bag device of the prior art.

As shown in FIG. 9, an air bag device of the embodiment is constructed by attaching both an inflater 46 and an air bag 50 to be extended by the inflater 46 to a main plate 44a of a retainer 44 and by covering the folded air bag 50 with a module cover 48.

The air bag 50 consists of a front panel 50a and a rear panel 50b. The panels 50a, 50b are overlapped and sewn at their peripheral portion together by a sewing machine to form the air bag.

Figure 1A:
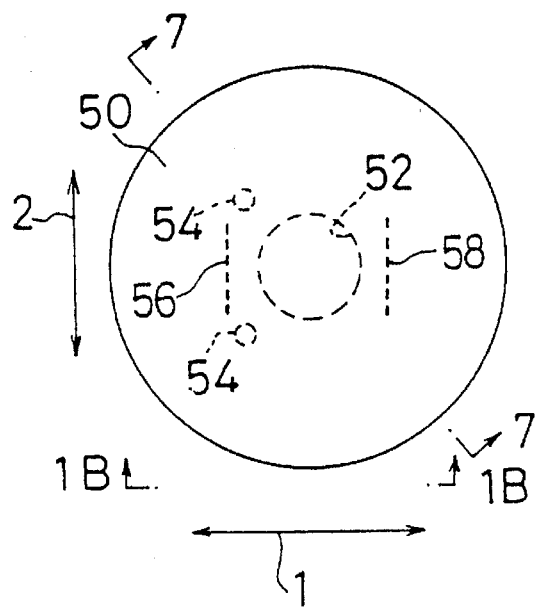
FIG. 1A is a plan view of an air bag 50 according to the present invention.
Figure 1B:
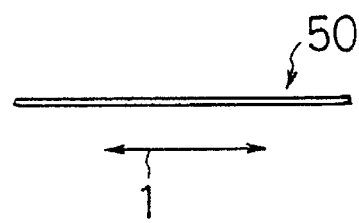
FIG. 1B is a side view of the air bag 50 taken along a line 1B—1B in FIG. 1 according to the present invention.
Figure 7:
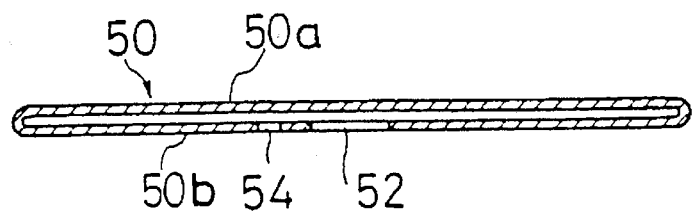
FIG. 7 is a sectional view taken along the line 7—7 of FIG. 1.

This air bag 50 takes a flattened disc shape, as shown in FIGS. 1A and 7, when it is not supplied with the gas. The bag 50 has at the center of the rear panel 50b an opening 52 for receiving the leading end of the inflater 46. The air bag 50 has vent holes 54 for inhaling the air, when it is extended, and for releasing the gas from its inside, after extended, to absorb the shocks coming from the human body hitting the air bag 50.

The front panel 50a and the rear panel 50b of the air bag 50 are sewed at two seams 56, 58 extending parallel to the direction of the diameter of the air bag 50.

Figure 2A:
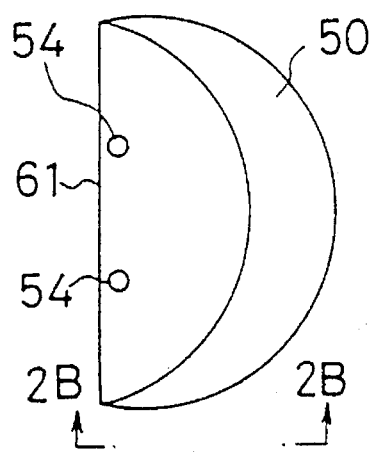
FIG. 2A is a plan view of the air bag 50 being folded.
Figure 2B:
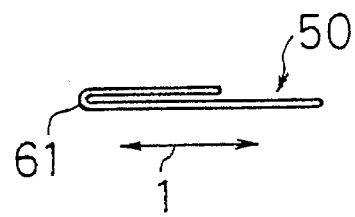
FIG. 2B is a side view of the air bag 50 taken along a line 2B—2B in FIG. 2A.
Figure 3A:
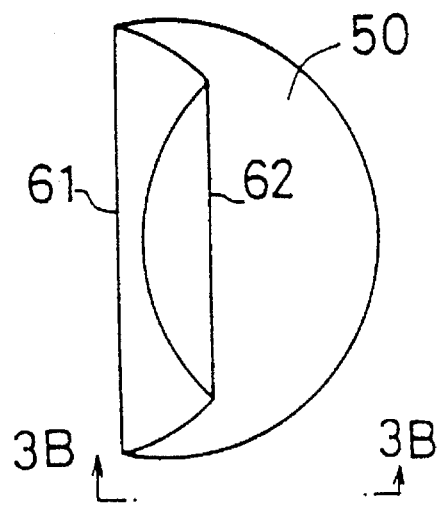
FIG. 3A is a plan view of the air bag 50 being folded.
Figure 3B:
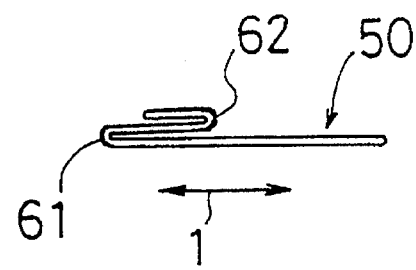
FIG. 3B is a side view of the air bag 50 taken along a line 3B—3B in FIG. 3A.
Figure 4A:
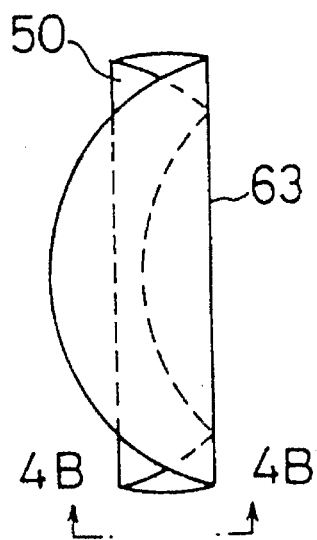
FIG. 4A is a plan view of the air bag 50 being folded.
Figure 4B:
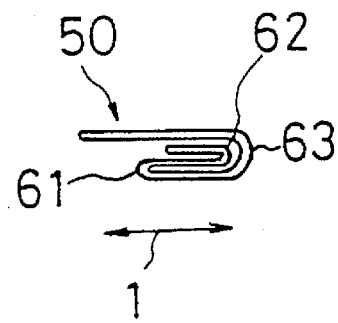
FIG. 4B is a side view of the air bag 50 taken along a line 4B—4B in FIG. 4A.

The method of folding the air bag 50 will be described in the following with reference to FIGS. 1A to 6B. At first, as shown in FIG. 2, the air bag 50 has its lefthand half folded to the front along a fold 61 slightly offset to the left from the center. As shown in FIGS. 3A and 3B, the folded half has its leading end folded back along a fold 62 extending in parallel with the fold 61. Then, as shown in FIGS. 4A and 4B, the remaining righthand half of the air bag 50 is folded back along a fold 63 which is slightly offset to the right from the center but in parallel with the fold 62, and the folded leading end is further folded back along a fold 64 which is also in parallel with the fold 63.

Figure 5A:
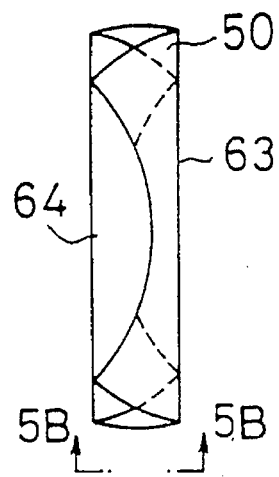
FIG. 5A is a plan view of the air bag 50 being folded.
Figure 6A:
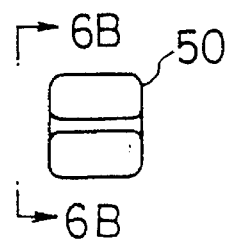
FIG. 6A is a plan view of the air bag 50 being folded.
Figure 6B:
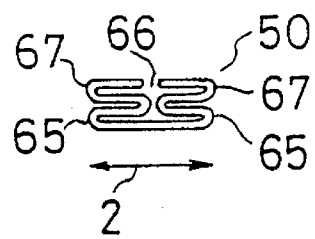
FIG. 6B is a side view of the air bag 50 taken along a line 6B—6B in FIG. 6A.

In these ways, the air bag 50 is folded several times in a first direction 1 into a rectangular shape, as shown in FIG. 5A. After this, the rectangular air bag 50 is folded back in a zigzag manner along folds 65, 66 and 67 until it takes a generally square shape as shown in FIGS. 6A and 6B.

The air bag 50 thus folded is then covered with the module cover 48 so that the air bag device shown in FIG. 9 is prepared.

Figure 8:
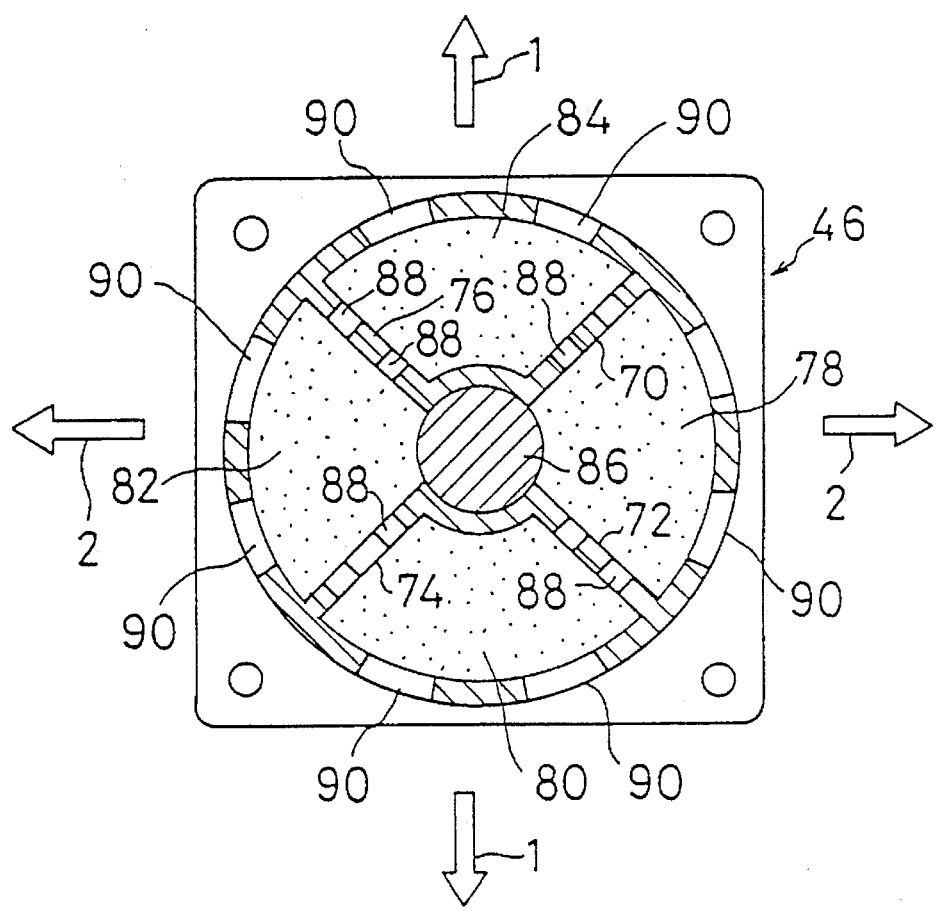
FIG. 8 is a sectional view showing an inflater 46.

As shown in FIG. 8, the inflater 46 has its inside divided by four radially extending partitions 70, 72, 74 and 76 into four compartments 78, 80, 82 and 84. These compartments 78 to 84 are individually charged with gas generating agents. The inflater 46 is equipped at its center with an igniter 86, which is disposed to face the compartments 78 and 82 only. The partitions 70 to 76 are individually formed with openings 88 for allowing the gas produced by the reactions of the agents in the compartments 78 and 82 to be partially injected therethrough into the compartments 80 and 84 to cause the gas producing reactions of the agents in the compartments 80 and 84. Incidentally, the individual compartments 78 to 84 are formed with keyhole openings 90 for allowing the inside gases to flow therethrough into the air bag 50. These openings 90 are equipped along their inner faces with (not-shown) particulate trapping members made of mesh.

In the air bag device thus constructed, the gas is injected at first in a second direction 2 when the inflater 46 is activated. After lapse of a predetermined time, the gas is injected in the first direction 1. As a result, the air bag is unfolded or extended in the order of FIGS. 6, 5, 4, 3, 2 and 1.

Figure 5B:
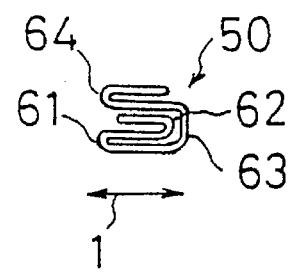
FIG. 5B is a side view of the air bag 50 taken along a line 5B—5B in FIG. 5A.

In this instance, the gas is injected at first in the second direction so that the air bag 50 is extended in the second direction. This second direction 2 is aligned with the direction, in which the gas is injected from the inflater 46, as shown in FIGS. 5, 6 and 8, so that the injected gas pressure is substantially effective to function to extend the air bag 50 vertically of FIG. 5A.

After the air bag 50 is extended in the second direction shown in FIG. 5A, the injected gas pressure from the inflater is applied to the air bag 50 to widen thereof in the first direction and to extend forward. The air bag 50 extends in the first direction and forward when the thread constituting the seams 56, 58 is chopped. In this case, the thread strength and the number of the stitches are preferably selected such that the thread of the seams 56, 58 is chopped after the air bag 50 extends in the first direction.

As described above, according to the air bag device of the embodiment, the air bag extends quickly in the direction along the main plate of the retainer 44 (up and down or right and left direction for the occupant of the driver's seat). Thereafter, the air bag extends in the direction towards the occupant.

In the embodiment described above, the front panel 50a and the rear panel 50b are connected by the seams 56, 58 stitched by a thread. However, the panels 50a and 50b may be bonded by an adhesive.

Figure 11:
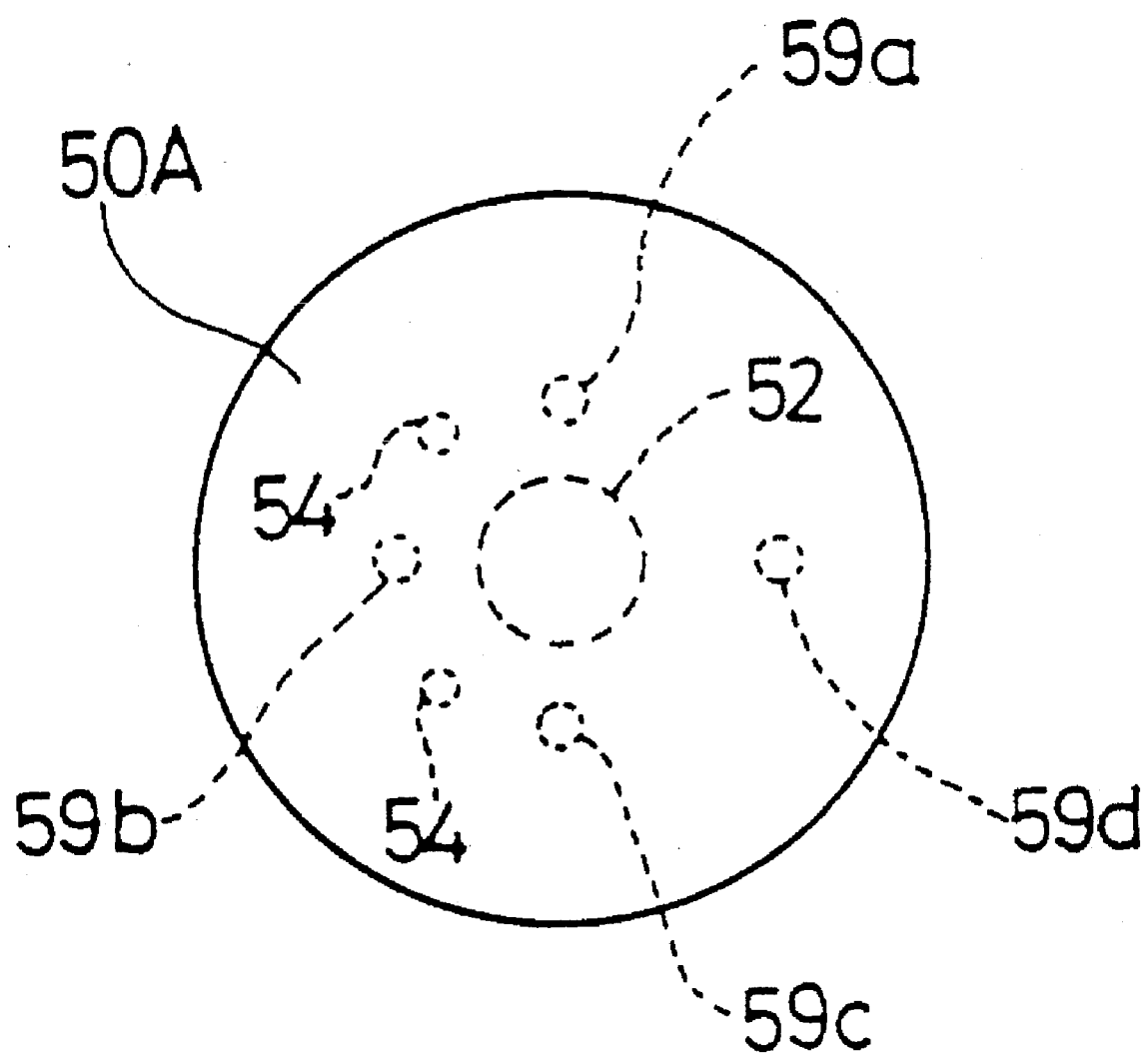
FIG. 11 is a plan view of the air bag 50A according to another embodiment.

In the embodiment described above, the panels 50a, 50b are connected by the straight seams 56, 58. However, the panels 50a, 50b may be connected by threads as an adhesive at plural points around the inflater inserting opening 52 as shown in FIG. 11. In FIG. 11, the panels are connected at four points of 59a, 59b, 59c and 59d.

As has been described hereinbefore, according to the present invention, the air bag can be quickly extended vertically and horizontally. Moreover, the injected gas pressure of the inflater effectively acts as the force to extend the air bag so that the air bag can be quickly extended even with a reduced inflater capacity.

What is claimed is:

1. An air bag for an air bag device to be inflated by an inflater, comprising:

a front panel and a rear panel sewn together at peripheral portions thereof to form the air bag, an opening for the inflater formed in a central portion of the rear panel, and means for connecting a vicinity of the central portion of said rear panel and said front panel, said connecting means having first and second connecting lines extending parallel to each other to locate the opening between the first and second connecting lines and to form a first part of the air bag located at a side of the first connecting line and a second part of the air bag located at a side of the second connecting line, said air bag being folded such that the first part of the air bag is folded over the front panel substantially along the first connecting line to overlap the second part; the second part of the air bag is folded over the first part substantially along the second connecting line to form an elongated substantially rectangular shape having two elongated halves; and each of said halves is folded without overlapping the other half and is located adjacent to each other to form a substantially square shape.

2. An air bag according to claim 1, wherein said air bag includes a first gas introduction path established between the first and second connecting lines and communicating the opening, said first gas introduction path introducing a gas from the inflater in two directions.

3. An air bag device comprising:

a retainer having a main plate and an inflater mounting opening in a center portion of the main plate, an inflater having a leading edge mounted in the opening of the retainer and formed with a plurality of gas injection ports in a side periphery of the leading edge, an air bag including a front panel, a rear panel having an opening, said front and rear panels being connected together at peripheral portions thereof and a periphery of the opening of the rear panel being mounted on the retainer around the inflater mounting opening, and first and second stitching lines made of thread with stitches and connecting the front and rear panels, said first and second stitching lines extending parallel to each other on both sides of the opening and forming a first part of the air bag located at a side of the first stitching line and a second part of the air bag located at a side of the second stitching line, said air bag being folded such that the first part of the air bag is folded over the front panel substantially along the first stitching line in first directions extending perpendicular to the stitching lines; the second part of the air bag is folded over the first part substantially along the second stitching line in the first directions to form an elongated substantially rectangular shape having two elongated halves; and each of said halves is folded in second directions extending parallel to the stitching lines without overlapping the other half and is located adjacent to each other to form a substantially square shape, said first and second stitching lines being chopped after the air bag extends in the second directions to thereby allow the air bag to extend in the first directions and also in a forward direction during deployment thereof, and a module cover covering said air bag, said module cover being torn by the air bag when the air bag is being extended.

4. An air bag according to claim 3, wherein said air bag includes a first gas introduction path established between the first and second stitching lines and communicating the opening, said first gas introduction path introducing a gas from the inflater in the second directions.

5. An air bag according to claim 1, wherein said means comprises an adhesive.

6. An air bag device according to claim 3, wherein the thread is selected to have a predetermined tensile strength and the number of the stitches is selected such that the connecting strength between the rear panel and the front panel is set as predetermined.

7. An air bag device according to claim 3, wherein said air bag is provided with vent holes for inhaling air to absorb shocks hitting said air bag.

8. An air bag device according to claim 3, wherein said air bag is made in said substantially square shape by folding its lefthand half to the front along a first folding line, folding back the leading end of the folded half along a second folding line, folding back the remaining righthand half of the air bag being folded back along a third folding line, folding back the folded leading end of the righthand half along a fourth folding line, folding back the air bag several times in the second direction in zigzag manners.

\* \* \* \* \*